United States Patent [19]

Clausing

[11] 4,285,026
[45] Aug. 18, 1981

[54] PARALLEL PLANE SHUTTER FOR LK BREAKER

[75] Inventor: Challiss I. Clausing, Marlton, N.J.

[73] Assignee: Gould Inc., Rolling Meadows, Ill.

[21] Appl. No.: 66,189

[22] Filed: Aug. 13, 1979

[51] Int. Cl.³ ............................................. H02B 1/04
[52] U.S. Cl. .................................. 361/345; 361/337; 200/50 AA
[58] Field of Search ....................... 200/50 R, 50 AA; 361/335, 336, 339, 343, 345, 304

[56] References Cited

U.S. PATENT DOCUMENTS

| | | | |
|---|---|---|---|
| 3,002,129 | 9/1961 | Mueller | 361/337 |
| 3,015,756 | 1/1962 | Kreekon | 361/337 |
| 4,183,073 | 1/1980 | Clausing | 361/345 |

*Primary Examiner*—Gerald P. Tolin
*Attorney, Agent, or Firm*—Ostrolenk, Faber, Gerb & Soffen

[57] ABSTRACT

Circuit breaker cubicle shutters wherein a pair of shutters are slidable vertically with respect to a back plate and with respect to each other and behind the back plate. The back plate is provided with a plurality of upper openings registering with upper stationary connectors and a plurality of lower openings registering with lower stationary connectors. The shutters are interconnected by links pivotally mounted on the back plate and interconnecting the lower portion of the lower shutter with the lower portion of the upper shutter. An actuator comprises a bell crank lever one end of which is engaged by a pin or roller on a circuit breaker as it is moved into the cubicle to rotate the same. The other end of the actuator is connected to the lower shutter to pull the lower shutter from an upper closed position in which it is maintained by tension springs to a lower position in which an opening in the lower shutter registers with the lower set of openings in the plate. The shutters are interconnected by links sandwiched between them so that the upper shutter will be moved upwardly by downward movement of the lower shutter. The Z-shaped arrangement of the links ensures that the openings are not blocked when the shutters are moved to a position where openings in the said shutters register with openings in the plate.

8 Claims, 6 Drawing Figures

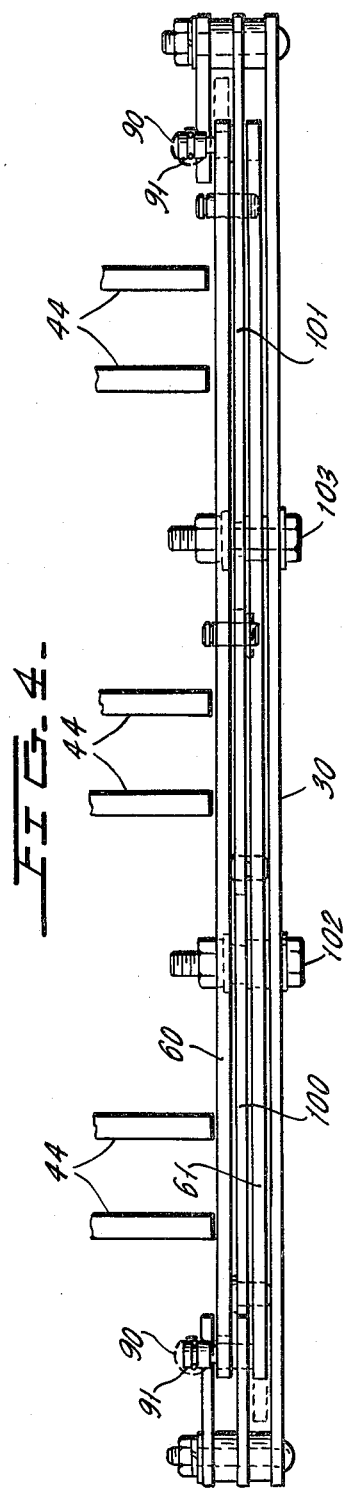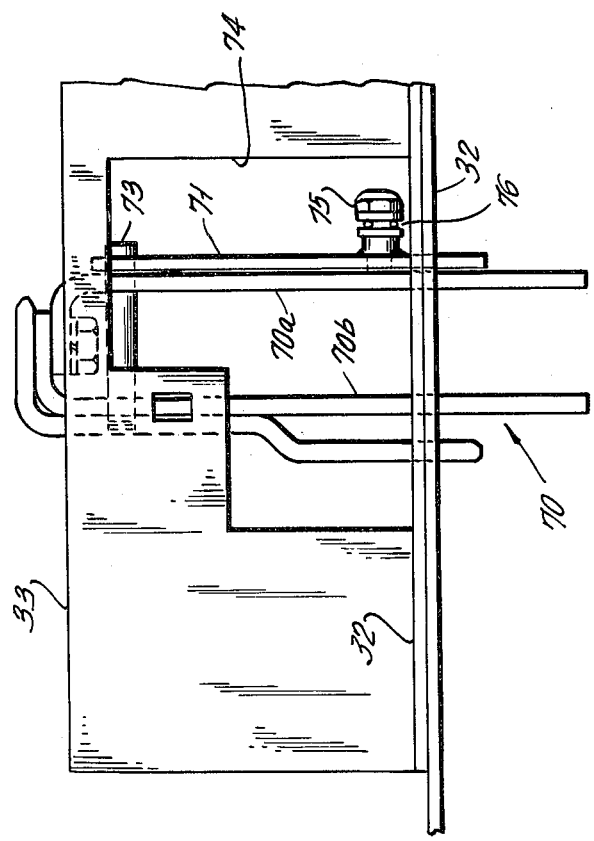

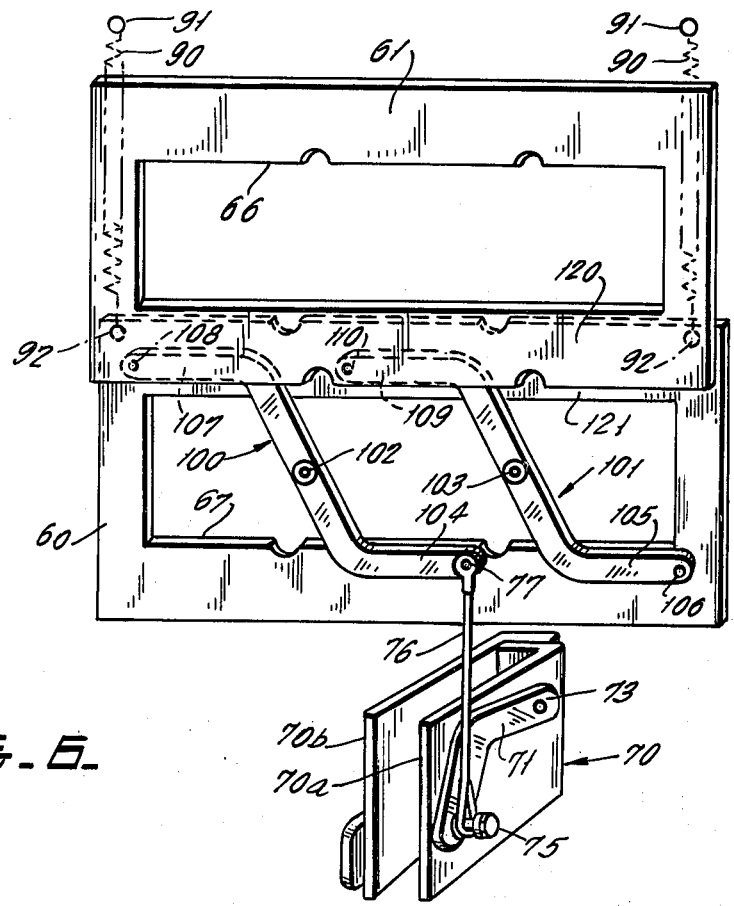
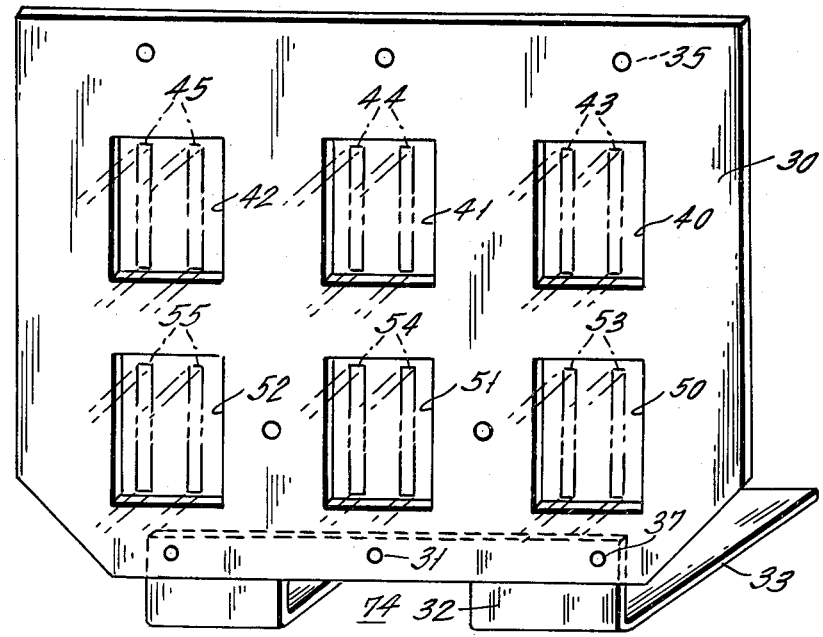
FIG. 6.

PARALLEL PLANE SHUTTER FOR LK BREAKER

The present invention relates to circuit breakers and more particularly to draw out circuit breakers mounted in a cubicle in which the rear of the cubicle is provided with stationary disconnect contacts which are engageable by corresponding disconnect contacts of the circuit breaker when it is inserted into a cubicle.

One of the problems related to the utilization of draw out circuit breakers is that when the circuit breaker is withdrawn from its operative position in the cubicle it becomes desirable to cover the stationary disconnect contacts of the cubicle so that they are not accidentally accessible to anyone who may be working in the cubicle as well as to protect the cubicle disconnect contacts. Therefore devices known as shutters have been developed for this purpose. One such prior device that has been utilized in order to provide a cover or shutter for said back disconnect contacts is shown in U.S. Pat. No. 4,183,073 issued Jan. 8, 1980, assigned to the assignee of the present invention. The said prior application refers to other prior pending applications and patents which describe the circuit breaker and particularly the housing or cubicle therefor in which the shutter of the present invention is utilized.

Essentially the present invention comprises the utilization, at the rear wall of a cubicle in which a plurality of back disconnect contacts are provided, of a fixed back plate with a number of openings corresponding to and registering with each of the back disconnect contacts. Since in three phase circuit breakers and three phase circuits it is common in such cubicle to have three upper stationary back disconnect contacts and three lower stationary back disconnect contacts, the plate which is stationary in front of the back disconnect contacts is provided with six corresponding openings matching the six contacts.

A pair of movable plates or shutters are provided in the present invention in back of the stationary back plate. The movable plates register respectively with the upper and lower openings of the stationary plate which in turn register with the upper and lower back disconnect contacts. The two movable plates are simultaneously slidably mountable to move from a position where both of the plates block the openings in the stationary plate which provide access to the stationary disconnect contacts to another position where they are removed from the blocking position and provide access to the back disconnect contact. A pair of pivoting Z-shaped members each connected at opposite ends to both movable plates are sandwiched between the moving plates and are arranged on fixed pivot points so that movement of these Z-shaped members around a stationary pivot will result in simultaneous movement of the two movable plates between the position where the plates close the access to the stationary disconnect contacts and provide access to the stationary disconnect contacts.

An actuating member for operating the movable plates or shutters is cammed downward by a pin on the circuit breaker as it is moved toward the rear of the cubicle.

A cradle is provided in the cubicle for receiving the circuit breaker as described in the prior application above referred to and the rear of the cradle is provided with the appropriate openings for the back disconnect contacts; the black plate previously referred to is stationary in front of the openings with each opening in the back plate corresponding to an opening in the cradle and the position of the stationary cubicle disconnect contacts.

The actuating member is connected to the lower of the two movable back plates or shutters in a suitable manner as hereinafter described. In operation, the circuit breaker is introduced into the cradle within the cubicle and when the circuit breaker reaches the desired point in its movement toward the rear of the cubicle a pin on the circuit breaker strikes the actuating member camming down the end thereof engaged by the pin. This pulls down the lower sliding plate or shutter and exposes the lower portion of the cubicle terminals. Because the Z-shaped connector pieces are pinned to the lower sliding piece and also to the upper sliding piece and stationarily pivoted between them, the same motion now carries the upper sliding plate or shutter upward thereby exposing the upper cubicle terminals. When the circuit breaker is withdrawn from the cubicle the reverse operation occurs. The pin on the circuit breaker is disengaged from the actuating member thereby permitting the lower shutter plate to move down and the connection between the lower shutter plate and the upper shutter plate causes the upper shutter plate to move up. The two shutters move toward each other to cover the openings to the cubicle disconnect contacts and away from each other to provide access to the cubicle contacts.

The primary object of the present invention is the provision of a simplified shutter means for blocking access to the stationary terminal contacts at the rear of a cubicle in which a draw out circuit breaker is to be placed when the draw out circuit breaker is moved away from the back of the cubicle; the said means providing access to the stationary terminal contacts within the cubicle when the circuit breaker is fully inserted in position into the cubicle.

The foregoing and many other objects of the present invention will become apparent in the following description and drawings in which:

FIG. 4 is a cross-sectional view of a portion of the cubicle of FIGS. 1, 2 and 3 taken from line 4—4 of FIG. 2 looking in the direction of the arrows;

FIG. 5 is a view partly in cross-section of the operating mechanism for the shutters of the cubicle taken from line 5—5 of FIG. 2 looking in the direction of the arrows.

FIG. 6 is a composite schematic perspective showing the operation of the device including the stationary plate, the two movable plates and the operating mechanism therefor.

Figure 1:
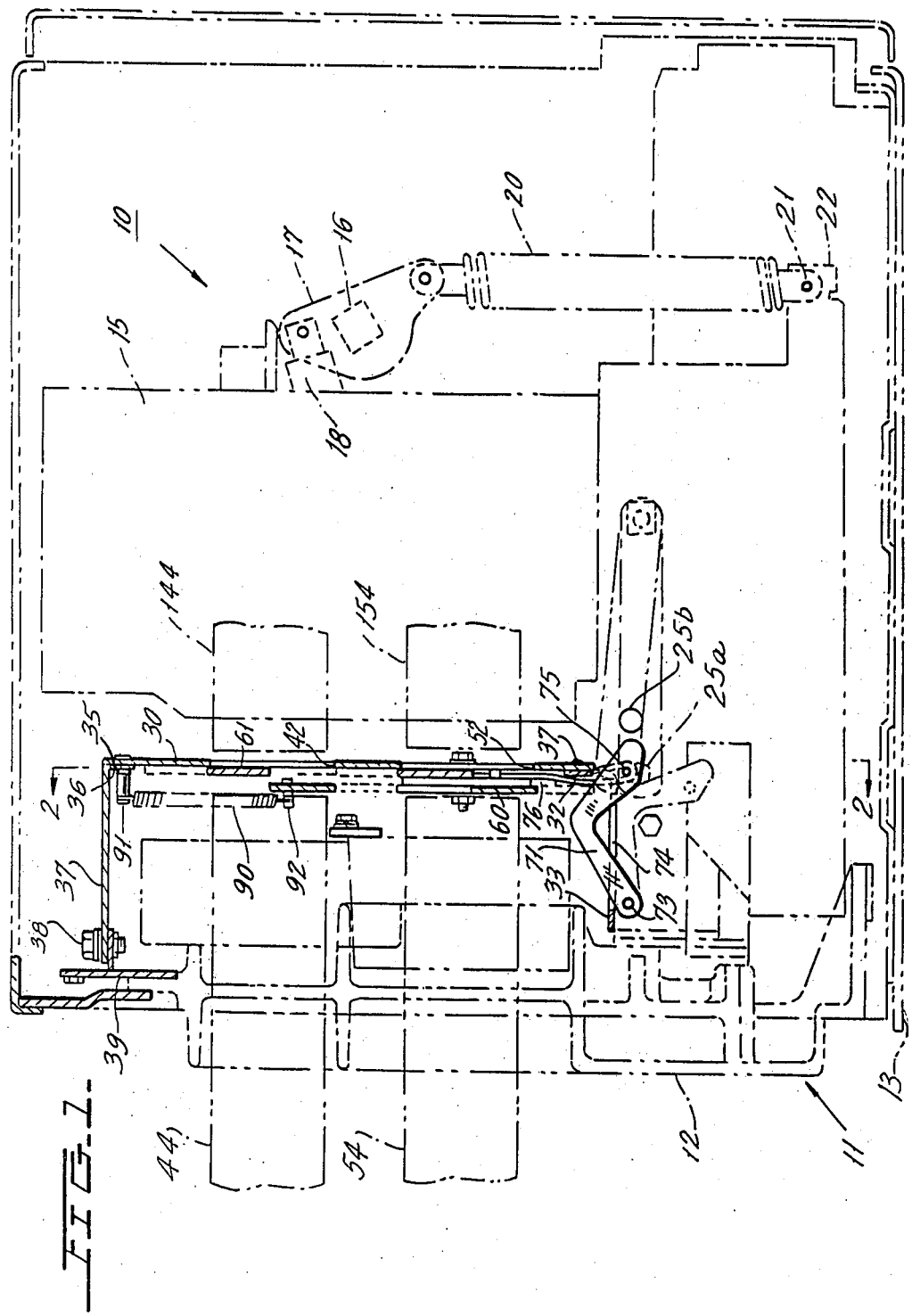
FIG. 1 is a cross-sectional side view through the cubicle with the circuit breaker inserted into the cubicle but sufficiently withdrawn to permit the shutters to be closed.

Referring to the Figures, the cubicle 10 is provided with a cradle 11 having a back wall 12 and a lower horizontal section 13. The cradle receives and positions the circuit breaker in a manner described in the applications and patents referred to, particularly U.S. Pat. No. 4,205,207 issued May 27, 1980, for a "CIRCUIT BREAKER CRADLE." A circuit breaker 15 of the type described in the prior applications having an operating shaft 16 and an operating arm 17 individual to each of the poles of the circuit breaker and connected to each individual movable contract of the circuit breaker by the connecting link 18 is provided on the circuit breaker. The circuit breaker operating shaft 16 is biased toward an open position for the movable contacts (not shown) by the tension spring 20 connected to the operating arm 17 on the operating shaft 16 and connected at its lower end at the pin 21 to an extension 22 which is stationary with respect to the circuit breaker. The circuit breaker is movable in and out of the cubicle as previously described.

Figure 2:
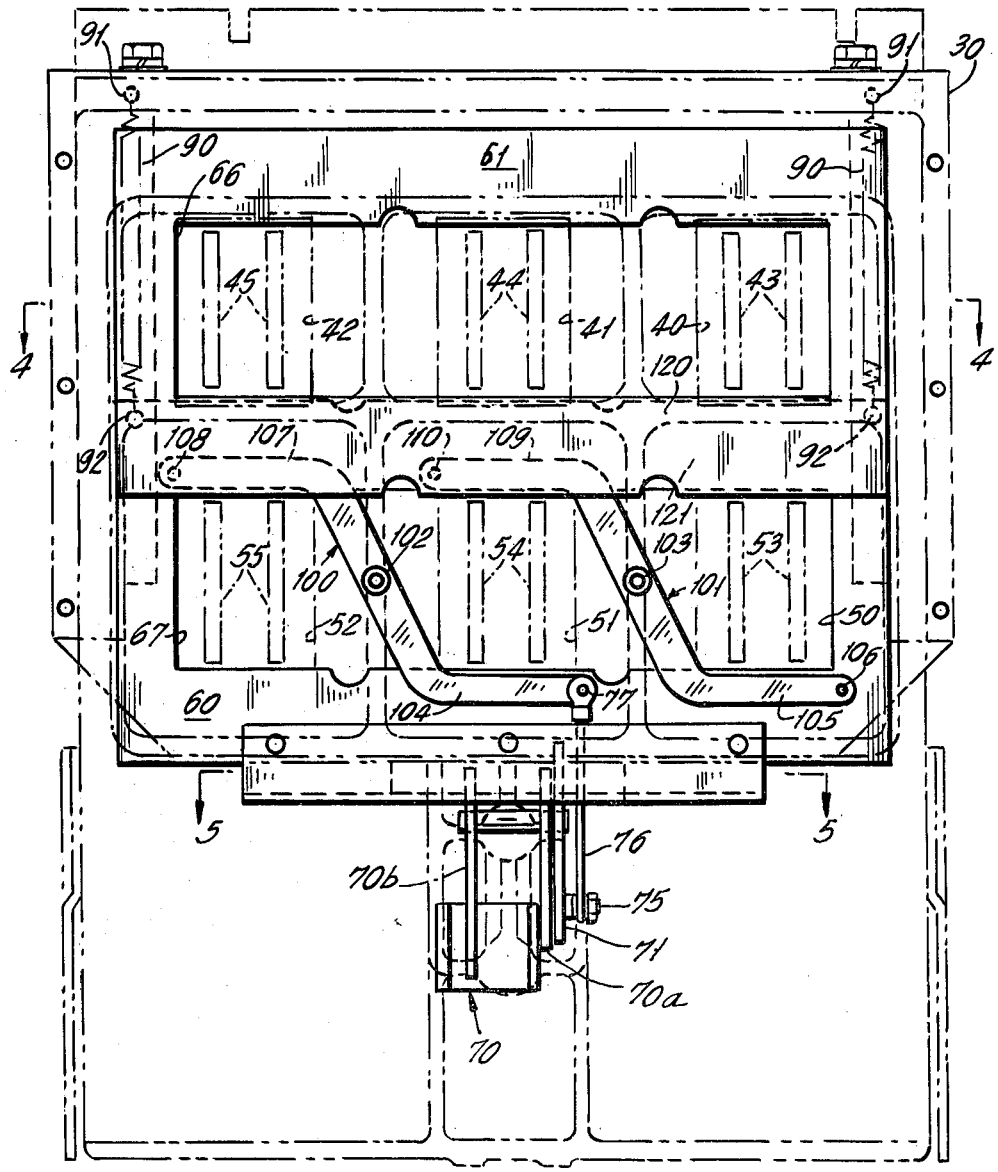
FIG. 2 is a view of the rear of the cubicle taken from line 2—2 of FIG. 1 looking in the direction of the arrows but showing the shutters moved to open position.

On initiation of movement of the circuit breaker toward the front of the cubicle the circuit breaker is moved to the position shown in FIG. 2 and an actuating pin 25 is moved from the dotted line position shown at 25a to the solid line position shown at 25b.

The solid line position is the position wherein the operation of removing the circuit breaker from the cubicle and moving the circuit breaker toward the front of the cubicle has been initiated to the extent that the contacts of the circuit breaker have necessarily been tripped and the back disconnect contacts of the circuit breaker as described in the prior applications and patents have been disengaged from the stationary back disconnect contacts. It is at this point desirable to isolate the circuit breaker and its cubicle from the back disconnect contacts and thereafter to isolate the cubicle, should the circuit breaker be removed, from the back disconnect contacts. When the circuit breaker 15 is moved fully into the cubicle the pin 25 on the circuit breaker moves from the solid position 25b to the dotted line position 25a and actuates the shutters as hereinafter described to provide access to the stationary back disconnect contacts entering through the cradle openings in the cubicle.

As seen in the Figures and particularly in the expanded schematic view of FIG. 6, the stationary plate 30 is secured at its lower end in any suitable manner as by the rivets 31, 31 to the vertical angle piece 32 extending up from the bottom plate 33 which is a part of the cradle 11 of the circuit breaker. The plate 33 is itself secured to the cradle 11 in any suitable manner. The upper end of the stationary front plate 30 is secured in any suitable manner as, for instance, by passing rivets through appropriate openings 35 of the stationary plate 30 into the downwardly extending flange 36 (FIG. 1) of the plate 37 secured in a suitable manner as by the bolts 38 to a stationary portion 39 of the cradle 11. The back plate 30 is provided with a plurality of upper openings 40, 41, 42 registering with the upper stationary back disconnect contact 43, 44, 45 in the cubicle, the said openings 40, 41, 42 providing access to the upper stationary disconnect contacts in the cubicle. Similarly a set of lower openings 50, 51 52 is provided in the stationary plate 30 registering with the lower cubicle disconnect contacts 53, 54, 55. The respective sets of contacts 43, 44, 45 and 53, 54, 55 are thus accessible through the said openings in the back plate 30.

A pair of vertically sliding shutter plates comprising a lower shutter plate 60 and an upper shutter plate 61 are provided behind the back plate 30. These shutter plates are arranged as shown in the position of FIG. 6 so that the opening 66 in the upper shutter plate 61 and opening 67 in the lower shutter plate 60 register respectively with the openings 40, 41, 42 of the stationary back plate and the openings 50, 51, 52 of the stationary back plate in order to provide access to the contacts 43, 44, 45 and 53, 54, 55.

The cradle 11 carries a forwardly directed extension comprising a support 70 on which is mounted the actuator 71. The actuator 71 is mounted on the stationary pivot pin 73 passing through the sections 70a and 70b of the support 70. The actuator 71 is provided with a connecting pin 75 at its rear end, which extends through the notch 74 in the flange 32 which supports the plate 30. Pin 75 is connected by the member 76 to a pin 77 on the lower shutter 60.

Figure 3:
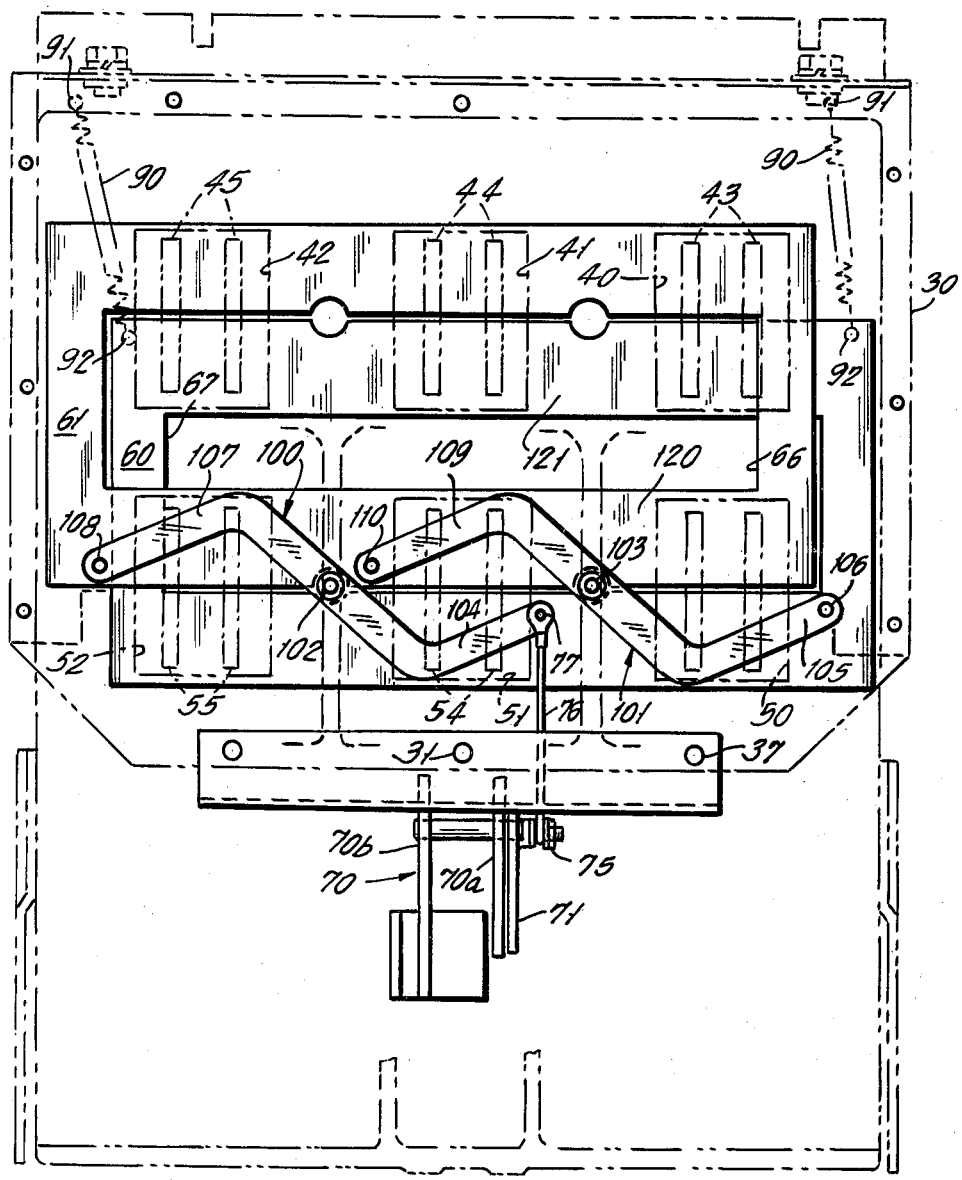
FIG. 3 is a view corresponding to that of FIG. 2 showing the shutters in closed position as in FIG. 1.

The operation requires that the shutters 61 and 60 move from the closed position shown in FIG. 3 to the open position shown in FIGS. 2 and 6. The shutters 60 and 61 are interconnected. A tension spring 90 provided between a pin 91 on flange 36 and pin 92 at the upper end of the lower shutter 60 will normally bias the lower shutter 60 to an up position as shown in FIGS. 1 and 3. The spring 90 is repeated on each side. When therefore the pin on the circuit breaker 15 moves from the solid line position 25b to the dotted line position 25a it moves the actuator 71 downwardly clockwise with respect to FIG. 1 and counter-clockwise with respect to FIG. 6 to pull on the connector 76 which may be a wire, therefore pulling on the pin 77 to pull the lower shutter 60 down to the position shown in FIGS. 2 and 6. The tension spring 90 on each side is extended as the shutter 60 is drawn down. The open position is shown in FIG. 6 with the shutter 60 having moved down and extended the tension springs 90 on each side. The open position is also shown in FIG. 2.

The closed position is shown in FIG. 3 and in FIG. 1; in these figures, the pin 25 of the circuit breaker 15 has been withdrawn from the actuator 71 permitting the tension spring 90 to pull the lower shutter 60 up and the Z-shaped members hereinafter described to pull the upper shutter down as a result of the movement of the lower shutter.

Comparison of FIGS. 2 and 3, demonstrates that the movement from the closed position of FIGS. 3 and 1, to the open position of FIGS. 2 and 6 is completed not only by engagement of the pin 25 of circuit breaker 15 with actuator 71, but also by the Z-shaped connectors or links 100, 101 which interconnect the lower shutter 60 and the upper shutter 61 in the manner hereinafter described for simultaneous operation in opposite directions.

Each of the Z-shaped connectors or links 100, 101 is pivotally mounted on the respective stationary pivots 102, 103 which may be carried by the plate 30. The arm 104 of connector 100 extending to the right with respect to FIGS. 2 and 3, is pivotally connected at the pin 77 to the lower run of the lower shutter 60. The right hand arm 105 of Z-shaped link 101 is also connected rotatably on the pin 106 which is also connected to the lower section of shutter 60. The left hand arm 107 of Z-shaped connector 100 is pivotally connected on the pin 108 at the lower section of the upper shutter 61. Similarly, the left hand arm 109 of the Z-shaped connector 101 is pivotally connected at the pin 110 to the lower run of the upper shutter 61.

Hence when the actuator 71 is moved from the solid line position shown in FIG. 1 to the dotted line position shown in FIG. 1, the connecting wire 76 is pulled down, thereby pulling down the pin 77 and pulling down the lower shutter 60 and extending the tension springs 90 on each side connected to the lower shutter 60. The pulling down of the lower shutter 60 causes each of the two Z-shaped connectors 100, 101 to rotate about their stationary pivots 102, 103 thereby rotating the connectors 100, 101 in a clockwise direction from the position of FIG. 3 to the position of FIG. 2. The arm 107 of connector 100 and the arm 109 of connector 101 thus through the respective pins 108 and 110 raise the upper shutter 61. The opening 66 of the upper shutter 61 and the opening 67 of the lower shutter 60 are then lined up respectively with the openings 40, 41, 42 in the plate 30 and the openings 50, 51, 52 of the plate 30.

As previously pointed out the tension spring 90 on each side engaging the upper end of the lower shutter 60 has at this point been extended. When the circuit breaker is moved toward the front of the cubicle from the dotted line inserted position of FIG. 1 to the solid line position of FIG. 1, then the pin 25 is moved from position 25a to position 25b and the actuator 71 is no longer under the influence of the pin 25 of the circuit breaker 15. Hence the tension springs 90 may now pull the lower shutter 60 up. The pulling of the lower shutter 60 up causes a reverse operation to that previously described in connection with the Z-shaped connector arms 100, 101 to cause these connector arms to rotate counter-clockwise from the position of FIG. 2 to the position of FIG. 3; therefore the pulling up of the lower shutter 60 causes the upper shutter 61 to move down. At least a portion of the solid section 120 of shutter 61 and 121 of lower shutter 60 is thus aligned with at least a portion of the openings 40, 41 and 42 and 50, 51, 52 of the back plate.

The location of shutters 60 and 61 behind the back plate 30 inhibits possible manual manipulation of the shutters by directly engaging the shutters although the actuator 71 may be manipulated. This location of the shutters also provides a clear uncluttered appearance of the back of the cubicle.

The transverse sections 120, 121 of the respective shutters 61 and 60 may be of such width as to either completely block the openings or to partially block them as may be desired and the proportions and degree of movement of the different parts both in closing and in opening are such as to ensure sufficient movement to obtain the entire desired blocking of the openings 40, 41, 42 and 50, 51, 52 and the desired full clearance of these openings.

The stationary contacts within the cubicle have been previously indicated as respectively 43, 44, 45 and 53, 54, 55. The center contact is indicated schematically in FIG. 1. The circuit breaker back disconnect contacts 144, 154 indicated schematically in FIG. 1 and equal in number and arrangement to the back disconnect stationary contacts 44 and 54 therein shown are, in the solid line of FIG. 1, shown just clear of the center openings 41 and 51 since the circuit breaker has been withdrawn to the solid line position, to a position where its own back disconnect contacts 144, 154 should no longer be engaged with the stationary back disconnect contacts 44 and 54 of the cubicle.

As will be seen from FIG. 4, the Z-shaped connectors 100, 101 are in effect sandwiched between the lower shutter 60 and upper shutter 61. The stationary pivots 102, 103 are held on the back plate 30. The Z-shaped of members 100, 101 provides a full clearance and entry through the openings of the back plate 30 to the cubicle contacts when the shutters 60, 61 are open.

By this structure therefore, a simplified means is provided for automatically protecting the back disconnect stationary contacts within the cubicle and limiting or preventing access thereto when the circuit breaker is withdrawn to a position in which its own back disconnect contacts no longer engage the stationary disconnect contacts in the cubicle. Thus when the circuit breaker is withdrawn within the cubicle or completely removed from the cubicle, the stationary back disconnect contacts in the cubicle are blocked and access to them is limited except with respect to any operator who happens to be working within the cubicle and decides that under the particular circumstances he must have access thereto and therefore manually operates the actuator 71 for that purpose.

While many shutters have been utilized including sliding shutters, rotating shutters, and lever operated shutters, the operation of the shutter in this structure is extremely simple and the shutters located behind the back plate impart a clean professional appearance to the rear of the cubicle and limit direct manual manipulation of the shutters. The two shutters are operated simultaneously since they are interconnected for operation and a simplified actuator is provided operating one of the shutters which in turn results in the operation of the other shutter in response only to movement of the circuit breaker within the cubicle. The device is fail safe since the normal position of the shutters is the closed position, the lower shutter being biased closed by the tension spring 90 and the upper shutter being connected to the lower shutter in such a manner that when the lower shutter is moved to a blocking position, the upper shutter is necessarily also moved to a blocking position.

In the foregoing the present invention has been described solely in connection with preferred illustrative embodiments thereof. Since many variations and modifications of the present invention will now be obvious to those skilled in the art, it is preferred that the scope of this invention be determined not by the specific disclosures herein contained but only by the appended claims.

What is claimed is:

1. A circuit breaker cubicle having a rear wall and a plate positioned at said rear wall, said circuit breaker cubicle having stationary connector members accessible at said plate in said rear wall, said plate at said rear wall having a plurality of openings registering individually with said connector members, the plurality of openings corresponding in position and number to said stationary connectors;

said stationary connectors being arranged in two horizontal rows one of said rows comprising a plurality of upper connectors the other of said rows comprising a plurality of lower connectors; said openings in said plate registering with said connectors comprising corresponding upper openings and lower openings;

and a pair of shutters slidably positioned at said plate, said shutters comprising an upper shutter and a lower shutter;

said upper shutter having openings registrable with said upper openings in said plate for said upper connectors and said lower shutter having openings in said plate for said lower connectors; said shutters being positioned parallel to said plate and slidable with respect thereto;

means for normally positioning said shutters in position where the openings therein are not in registry with the corresponding openings in said plate and therefore not in registry with said connector members;

an actuator member carried within said cubicle located adjacent the position of said plate; said actuator member comprising a lever pivoted on a stationary portion of said cubicle; one end of said lever being connected to one of said shutters, the other end of said lever extending forwardly of said plate;

a circuit breaker having an extension engageable with said actuator when said circuit breaker is moved toward the rear of said cubicle, said lever being rotated when said circuit breaker is moved into said cubicle toward the rear of said cubicle to move at least one of said shutters in a direction to register the openings in said shutter with the openings in said plate for said back connectors;

and a link connection between said one shutter connected to said actuator and the other shutter;

said link connection being pivotally mounted on stationary pivots on said plate with the opposite ends thereof being pivotally connected to said lower shutter and said upper shutter;

the movement of said lower shutter in one direction causing the movement of the other shutter in the opposite direction thereby causing the shutters to move simultaneously when the actuator member is moved in one direction to expose the openings in said plate and make the connectors accessible; and movement of said shutters simultaneously toward each other blocking said openings in said plate.

2. The circuit breaker cubicle and shutter of claim 1 wherein said plate has a plurality of upper openings; a plurality of stationary connectors each registering with one of said upper openings; and a plurality of lower openings; a plurality of stationary connectors each registering with one of said lower openings; and wherein said shutters are each provided with an opening, said shutters being each positioned wherein the lower shutter opening will register with all of said lower openings in said plate and the opening of the upper shutter will register with all of the upper openings in said plate when the shutters are moved to a position to make the connectors accessible.

3. The circuit breaker and shutter of claim 2 wherein the actuating member is a bell crank lever and the connection between the actuating lever and one of the shutters is a connection to the lower shutter, said connection constituting a member connected at one end to the end of the lever opposite that engaged by the extension of the circuit breaker and the opposite end of said connector being connected to a portion of the lower shutter.

4. The circuit breaker and shutter of claim 3 wherein said connection between the actuating member and the lower shutter is a connection which operates on application of tension thereto; and restoring springs for the said lower shutter when the circuit breaker member which engages the actuator is withdrawn from the actuator to restore the lower shutter to its original position wherein the openings therein do not register with the openings in the said plate.

5. The circuit breaker and shutter of claim 4 wherein the connecting link between the lower shutter and the upper shutter comprises a Z-shaped member carried between the lower shutter and the upper shutter, the said Z-shaped member permitting the arrangement of the links so that the links do not cross any of the openings in the said plate when the shutters are moved to open position.

6. The circuit breaker and shutter of claim 5 wherein at least two such Z-shaped connecting links are used in parallel.

7. The circuit breaker and shutter of claim 5 wherein the shutters are mounted to slide parallel to the plate along the side of the plate facing away from the circuit breaker.

8. The circuit breaker and shutter of claim 6 wherein said links are located between said two shutters.

* * * * *